US012315237B1

(12) United States Patent
Blechschmidt et al.

(10) Patent No.: US 12,315,237 B1
(45) Date of Patent: May 27, 2025

(54) END-TO-END SCENE GRAPH GENERATION (71) Applicant: Apple Inc., Cupertino, CA (US)

(72) Inventors: Angela Blechschmidt, San Jose, CA (US); Deep Chakraborty, Amherst, MA (US); Alexander Savvas Polichroniadis, San Francisco, CA (US); Mingshan Wang, Mountain View, CA (US); Eshan Verma, Mountain View, CA (US); Daniel Ulbricht, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 380 days.

(21) Appl. No.: 17/701,854

(22) Filed: Mar. 23, 2022

Related U.S. Application Data

(60) Provisional application No. 63/164,717, filed on Mar. 23, 2021.

(51) Int. Cl.
*G06V 10/82* (2022.01)
*G06N 3/047* (2023.01)
*G06N 3/084* (2023.01)
*G06V 10/20* (2022.01)

(52) U.S. Cl.
CPC ............ *G06V 10/82* (2022.01); *G06N 3/047* (2023.01); *G06N 3/084* (2013.01); *G06V 10/255* (2022.01)

(58) Field of Classification Search
None
See application file for complete search history.

(56) References Cited

U.S. PATENT DOCUMENTS

| | | | |
|---|---|---|---|
| 2021/0133990 A1* | 5/2021 | Eckart | G06T 7/344 |
| 2021/0174565 A1* | 6/2021 | Awasthi | G06F 18/23 |
| 2021/0241439 A1* | 8/2021 | Lutich | G06V 10/764 |
| 2023/0274472 A1* | 8/2023 | Liu | G06T 7/70 345/582 |

* cited by examiner

*Primary Examiner* — Darryl V Dottin
(74) *Attorney, Agent, or Firm* — Fernando & Partners, LLP (57) ABSTRACT

In one implementation, a method of generating a scene graph includes generating the scene graph using an end-to-end scene graph generator comprising an integrated neural network. For example, in various implementations, the method includes obtaining an image representing a plurality of objects. The method includes determining a relationship vector indicating spatial relationships between a particular object of the plurality of objects and others of the plurality of objects. The method includes determining, based on the relationship vector, an object type of the particular object.

20 Claims, 9 Drawing Sheets

END-TO-END SCENE GRAPH GENERATION

CROSS-REFERENCE TO RELATED APPLICATIONS

This application claims priority to U.S. Provisional Patent App. No. 63/164,717, filed on Mar. 23, 2021, which is hereby incorporated by reference in its entirety.

TECHNICAL FIELD

The present disclosure generally relates to generating a scene graph based on an image.

BACKGROUND

A scene graph of an image describes what objects are in an image and the spatial relationships between those objects.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for generating a scene graph. In various implementations, the method is performed by a device including one or more processors and non-transitory memory. The method includes obtaining an image representing a plurality of objects. The method includes determining a relationship vector indicating spatial relationships between a particular object of the plurality of objects and others of the plurality of objects. The method includes determining, based on the relationship vector, an object type of the particular object.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As noted above, a scene graph of an image describes what objects are in an image and the spatial relationships between those objects. However, in various implementations, the object types and the spatial relationships are determined in series rather than together.

Figure 1:
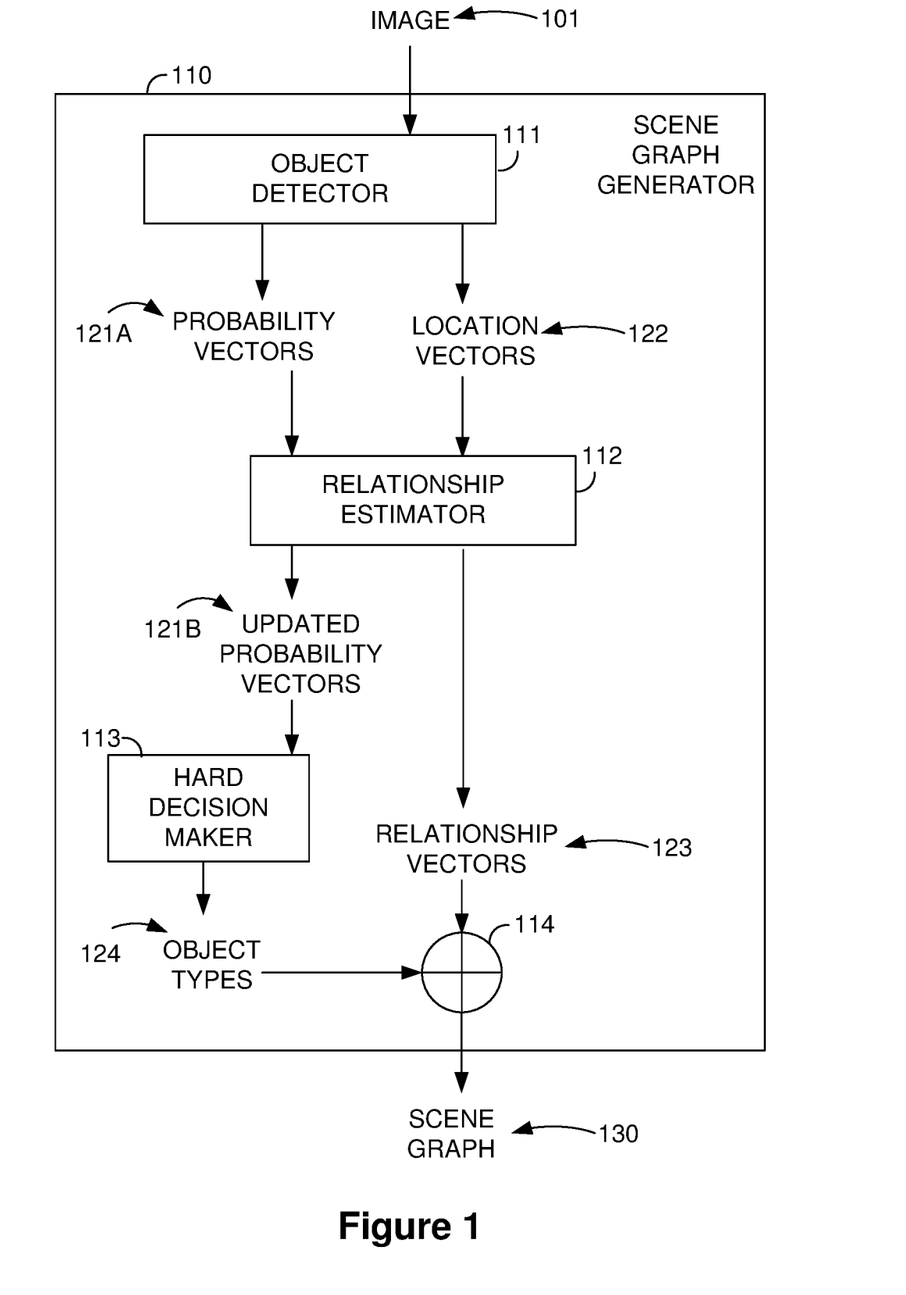
FIG. 1 illustrates a block diagram of a scene graph generator in accordance with some implementations.

FIG. 1 illustrates a block diagram of a scene graph generator 110 in accordance with some implementations. The scene graph generator 110 takes, as an input, an image 101 representing a plurality of objects and produces, as an output, a scene graph 130 of the image 101 that includes, for each of the plurality of objects, an object type of the object and a relationship vector indicating spatial relationships between the object and others of the plurality of objects.

In various implementations, the image 101 includes a plurality of pixels respectively located at a plurality of pixel locations in a two-dimensional coordinate system of the image 101. Each of the plurality of pixels has a respective pixel value. In various implementations, the pixel values range from 0 (representing black) to 255 (representing white). In various implementations, the pixel values are RGB color triplets, each element of the triplet representing a color channel and ranging in value from 0 to 255. In various implementations, the pixel values are RGBA vectors, the elements of the vector representing the red channel, green channel, blue channel, and alpha channel.

Figure 2:
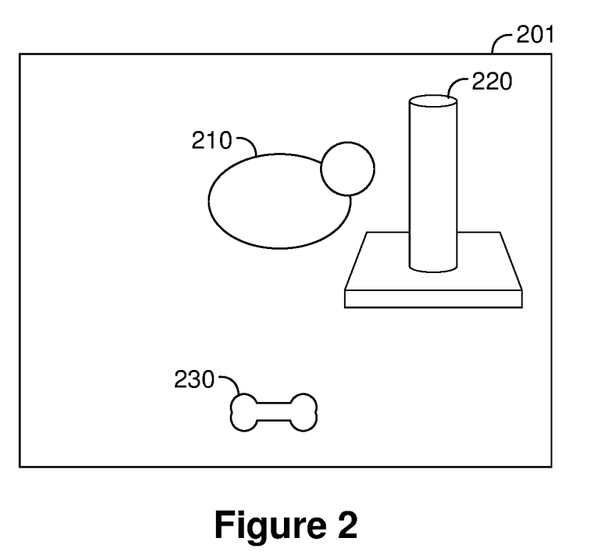
FIG. 2 illustrates an example image of an environment including a plurality of objects.

FIG. 2 illustrates an example image 201 of an environment including a plurality of objects. In particular, the environment includes a cat 210 next to a scratching post 220 in the background and a rawhide bone 230 in the foreground. Thus, the image 201 represents the cat 210, the scratching post 220, and the rawhide bone 230.

Referring again to FIG. 1, the scene graph generator 110 includes an object detector 111. The object detector 111 receives, as an input, the image 101 and produces, for each of the plurality of objects, a probability vector 121A of the object indicating the likelihood that the object is each of a plurality of object types and a location vector 122 indicating the location of the object in the image 101.

In various implementations, the location vector 122 for an object includes the coordinates in the two-dimensional coordinate system of the image 101 of each of four corners of a bounding box surrounding the object. In various implementations, the location vector 122 for an object includes the height and width of a bounding box surrounding the object and the coordinates in the two-dimensional coordinate system of the image 101 of a center of the bounding box.

As an example, in response to receiving the example image 201 of FIG. 2, the object detector 111 detects the cat 210 in a first region of the image and determines that the cat 210 has a probability of 0.40 of having an object type of "CAT", a probability of 0.45 of having an object type of "DOG", a probability of 0.03 of having an object type of "POST" and a probability of 0.02 of having an object type of "BONE". Further, the object detector 111 detects the scratching post 220 in a second region of the image and determines that the scratching post 220 has a probability of 0.10 of having an object type of "CAT", a probability of 0.1 of having an object type of "DOG", a probability of 0.75 of having an object type of "POST" and a probability of 0.05 of having an object type of "BONE". Further, the object detector 111 detects the rawhide bone 230 in a third region of the image and determines that the rawhide bone 230 has a probability of 0.10 of having an object type of "CAT", a probability of 0.10 of having an object type of "DOG", a probability of 0.05 of having an object type of "POST" and a probability of 0.75 of having an object type of "BONE".

Figure 3:
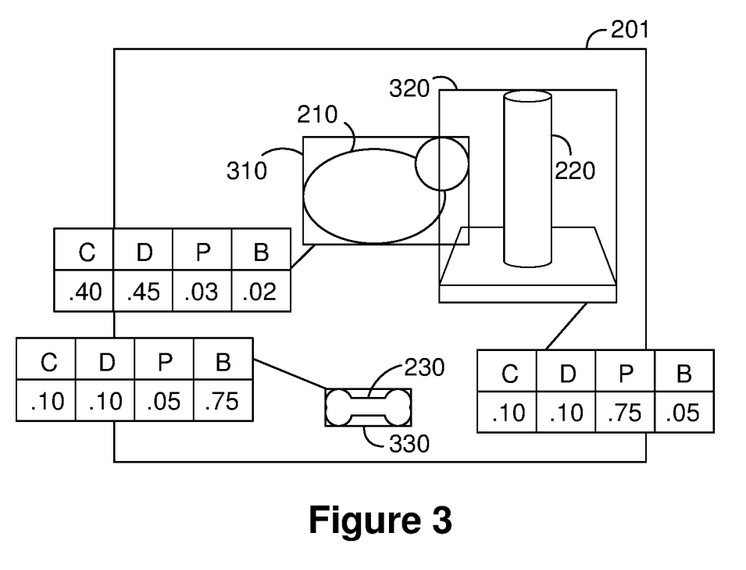
FIG. 3 illustrates the example image of FIG. 2 with bounding boxes labeled with object type probability vectors.

FIG. 3 illustrates the example image 201 of FIG. 2 with bounding boxes based on the example location vectors produced by the object detector 111 in response to receiving the example image 201 and labels based on the example probability vectors produced by the object detector 111 in response to receiving the example image 201. FIG. 3 includes, surrounding a region of the image 201 representing the cat 210, a first bounding box 310 labeled with a first probability vector. FIG. 3 includes, surrounding a region of the image 201 representing the scratching post 220, a second bounding box 320 labeled with a second probability vector. FIG. 3 includes, surrounding a region of the image 201 representing the rawhide bone 230, a third bounding box 330 labeled with a third probability vector.

In various implementations, the object detector 111 is an object detector neural network. In various implementations, the object detector neural network includes an interconnected group of nodes. In various implementations, each node includes an artificial neuron that implements a mathematical function in which each input value is weighted according to a set of weights and the sum of the weighted inputs is passed through an activation function, typically a non-linear function such as a sigmoid, piecewise linear function, or step function, to produce an output value.

In various implementations, the object detector neural network includes a deep learning neural network. Accordingly, in some implementations, the object detector neural network includes a plurality of layers (of nodes) between an input layer (of nodes) and an output layer (of nodes). In various implementations, the object detector neural network is a convolutional neural network.

In various implementations, the object detector neural network is trained on training data to set the weights of the nodes. In various implementations, the weights are selected to minimize a loss function. In various implementations, the training data includes images representing various objects at various locations and labels indicating the object types of the objects and their locations. Further, the loss function is a function of the output of the object detector neural network matching the labels. Thus, the weights of the object detector neural network are selected such that the output of the object detector neural network in response to a training image is most likely to match the corresponding label.

In various implementations, the object detector neural network implements differentiable functions such that the training data can be backpropagated through the object detector neural network to set the weights.

The scene graph generator 110 further includes a relationship estimator 112. The relationship estimator 112 receives, as an input, the probability vector 121A and the location vector 122 for each of the plurality of objects and produces, as an output, a relationship vector 123 for each of the plurality of objects. The relationship vector 123 for an object indicates a spatial relationship between the object and others of the plurality of objects. Spatial relationships include, but are not limited to, "IS NEAR", "IS FAR", "IS ABOVE", "IS BELOW", "IS IN FRONT OF", "IS BEHIND", "IS TO THE LEFT OF", and "IS TO THE RIGHT OF", and "HAS NO RELATION".

As an example, in response to receiving the probability vectors 121A and location vectors 122 generated by the object detector 111 for the example image 201 of FIG. 2, the relationship estimator 112 generates a relationship vector for the cat 210 indicating that the cat 210 "IS NEAR" the scratching post 220 and "IS ABOVE" the rawhide bone 230. Further, the relationship estimator 112 generates a relationship vector for the scratching post 220 indicating that the scratching post 220 "IS NEAR" the cat 210 and "HAS NO RELATION" to the rawhide bone 230. Further, the relationship estimator 112 generates a relationship vector for the rawhide bone 230 indicating that the rawhide bone 230 "IS BELOW" the cat 210 and "HAS NO RELATION" to the scratching post 220.

Figure 4:
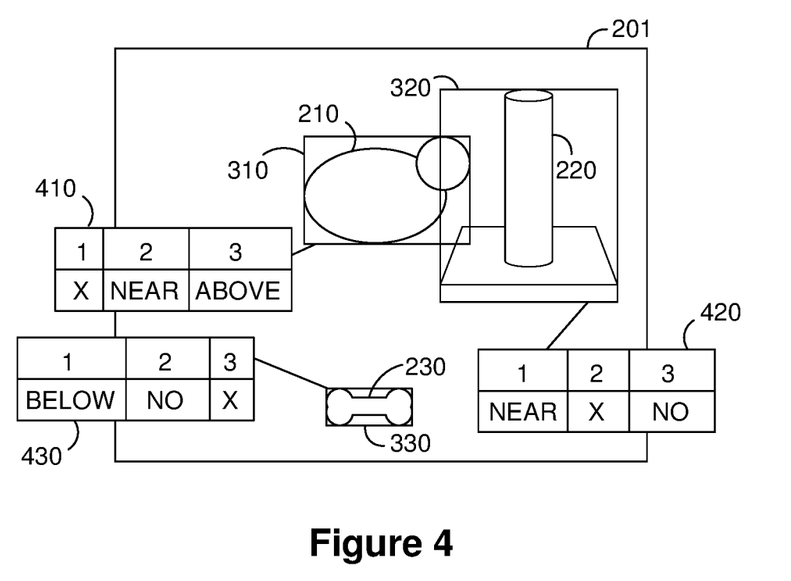
FIG. 4 illustrates the example image of FIG. 2 with bounding boxes labeled with relationship vectors.

FIG. 4 illustrates the example image 201 of FIG. 2 with bounding boxes based on the example location vectors produced by the object detector 111 in response to receiving the example image 201 and labels based on the example relationship vectors produced by the relationship estimator 111 in response to receiving the example image 201. FIG. 4 includes, surrounding a region of the image 201 representing the cat 210, a first bounding box 310 labeled with a first relationship vector 410. FIG. 3 includes, surrounding a region of the image 201 representing the scratching post 220, a second bounding box 320 labeled with a second relationship vector 420. FIG. 4 includes, surrounding a region of the image 201 representing the rawhide bone 230, a third bounding box 330 labeled with a third relationship vector 430.

In various implementations, the relationship estimator 112 is a relationship estimator neural network. In various implementations, the relationship estimator neural network includes an interconnected group of nodes. In various implementations, each node includes an artificial neuron that implements a mathematical function in which each input value is weighted according to a set of weights and the sum of the weighted inputs is passed through an activation function, typically a non-linear function such as a sigmoid, piecewise linear function, or step function, to produce an output value.

In various implementations, the relationship estimator neural network includes a deep learning neural network. Accordingly, in some implementations, the relationship estimator neural network includes a plurality of layers (of nodes) between an input layer (of nodes) and an output layer (of nodes). In various implementations, the relationship estimator neural network is a convolutional neural network.

In various implementations, the relationship estimator neural network is trained on training data to set the weights of the nodes. In various implementations, the weights are selected to minimize a loss function. In various implementations, the training data includes, for each of a plurality of objects, a probability vector, a location vector, and a relationship vector. Further, the loss function is a function of the output of the relationship estimator neural network matching the relationship vector for each of the plurality of objects. Thus, the weights of the relationship estimator neural network are selected such that the output of the relationship estimator neural network in response to probability vectors and location vectors is most likely to match the corresponding relationship vectors.

In various implementations, the relationship estimator neural network implements differentiable functions such that the training data can be backpropagated through the relationship estimator neural network to set the weights.

In various implementations, the relationship estimator 112 further produces, as an output, an updated probability vector 121B for each of the plurality of objects indicating the likelihood that the object is each of a plurality of object types.

The scene graph generator 110 includes a hard decision maker 113 which determines, for each object, an object type 124 of the object based on the updated probability vector 121B for the object. In various implementations, the hard decision maker 113 selects the object type with the highest probability of being correct. In various implementations, the hard decision maker 113 determines the object types 124 based on the probability vectors 121A. In various implementations, the hard decision maker 113 is integrated into the relationship estimator 112.

As an example, in response to receiving the updated probability vectors 121B generated by the relationship estimator 112 for the example image 201 of FIG. 2, the hard decision maker 113 generates an object type for the cat 210 of "DOG", an object type for the scratching post 220 of "POST", and an object type for the rawhide bone 230 of "BONE".

The scene graph generator 110 combines the object types 124 and the relationship vectors 123, e.g., using a combiner 114, to generate and output the scene graph 130. In various implementations, the combiner 114 aggregates the object types 124 and the relationship vectors 123 into the scene graph 130.

Figure 5:
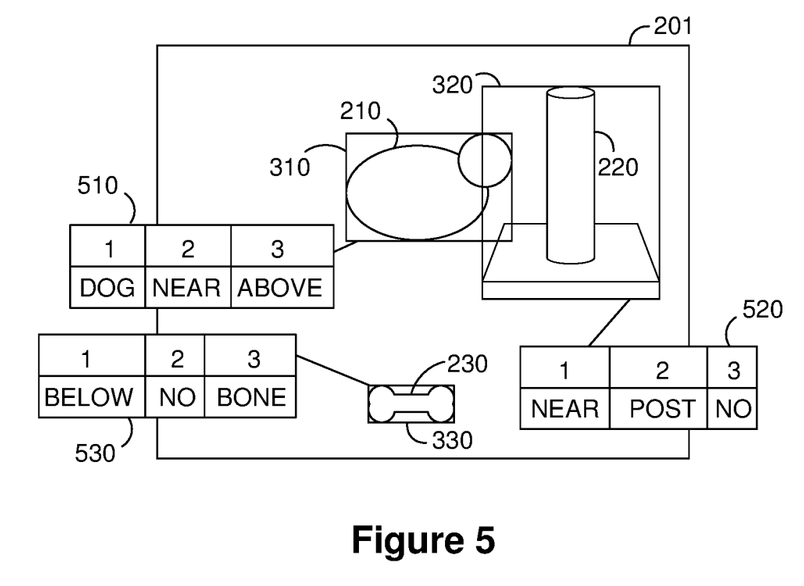
FIG. 5 illustrates the example image of FIG. 2 with bounding boxes labeled with object types and relationships.

FIG. 5 illustrates the example image 201 of FIG. 2 with bounding boxes based on the example location vectors produced by the object detector 111 in response to receiving the example image 201 and labels based on the example relationship vectors produced by the relationship estimator 111 and the example object type 124 produced by the hard decision maker 113 in response to receiving the example image 201. FIG. 5 includes, surrounding a region of the image 201 representing the cat 210, a first bounding box 310 labeled with a first type-relationship vector 510. FIG. 5 includes, surrounding a region of the image 201 representing the scratching post 220, a second bounding box 320 labeled with a second type-relationship vector 510. FIG. 5 includes, surrounding a region of the image 201 representing the rawhide bone 230, a third bounding box 330 labeled with a third type-relationship vector 530. Each type-relationship vector for an object includes, in a position of the object, the object type, and in the positions of other objects, a spatial relationship of the object with the other object.

Thus, in various implementations, the scene graph generator 110 includes two neural networks, the object detector 111 and the relationship estimator 112. Further, each of the two neural networks are independently trained on training data to set their respective weights.

In various implementations, the scene graph generator 110 improperly determines the object type of objects in an image. For example, in response to receiving the example image 201, the scene graph generator 110 incorrectly determines the object type of the cat 210 as "DOG" and not "CAT". In various implementations, the spatial relationships between objects can be used to improve the object classification (e.g., the determination of object type). For example, an object detected near the scratching post 220 is more likely a cat than a dog. In contrast, an object detected near the rawhide bone 230 is more likely a dog than a cat.

As another example, an object with a spatial relationship of "ON TOP OF" an object classified as "WATER" should be more likely to be classified as a "BOAT" than a "CAR". In contrast, an object with a spatial relationship of "ON TOP OF" an object classified as "ROAD" should be more likely to be classified as a "CAR" than a "BOAT".

Figure 6:
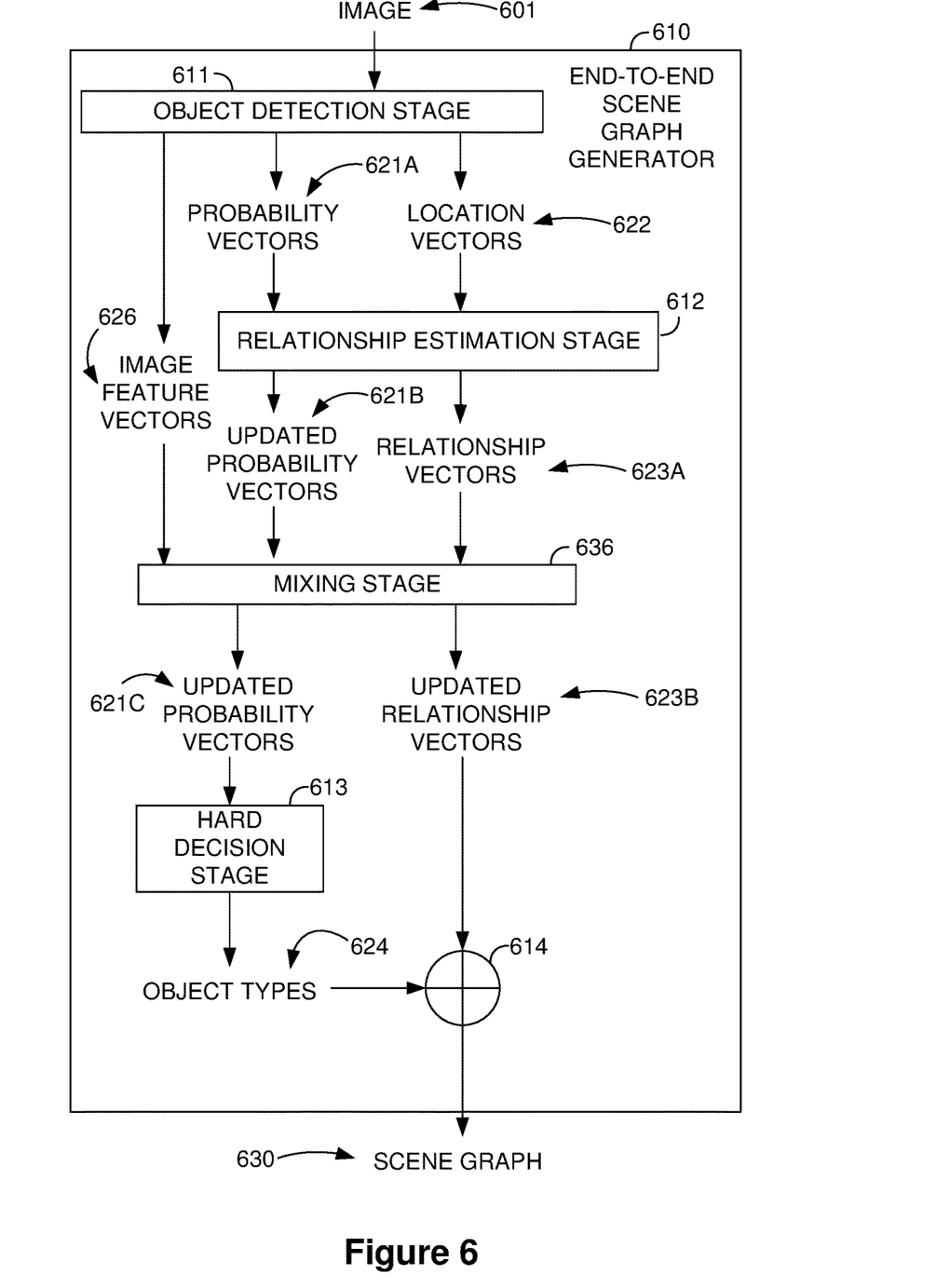
FIG. 6 illustrates a block diagram of an end-to-end scene graph generator in accordance with some implementations.

FIG. 6 illustrates a block diagram of an end-to-end scene graph generator 610 in accordance with some implementations in which object classification of objects is based on spatial relationships between the objects. The end-to-end scene graph generator 610 takes, as an input, an image 601 representing a plurality of objects and produces, as an output, a scene graph 630 of the image 601 that includes, for each of the plurality of objects, an object type of the object and a relationship vector indicating spatial relationships between the object and others of the plurality of objects.

In various implementations, the image 601 includes a plurality of pixels respectively located at a plurality of pixel locations in a two-dimensional coordinate system of the image 601. Each of the plurality of pixels has a respective pixel value. In various implementations, the pixel values range from 0 (representing black) to 255 (representing white). In various implementations, the pixel values are RGB color triplets, each element of the triplet representing a color channel and ranging in value from 0 to 255. In various implementations, the pixel values are RGBA vectors, the elements of the vector representing the red channel, green channel, blue channel, and alpha channel.

In various implementations, the end-to-end scene graph generator 610 is a scene graph neural network. In various implementations, the scene graph neural network includes an interconnected group of nodes. In various implementations, each node includes an artificial neuron that implements a mathematical function in which each input value is weighted according to a set of weights and the sum of the weighted inputs is passed through an activation function, typically a non-linear function such as a sigmoid, piecewise linear function, or step function, to produce an output value.

In various implementations, the scene graph neural network includes a deep learning neural network. Accordingly, in some implementations, the relationship estimator neural network includes a plurality of layers (of nodes) between an input layer (of nodes) and an output layer (of nodes). In various implementations, the scene graph neural network is a convolutional neural network.

In various implementations, the scene graph neural network is trained on training data to set the weights of the nodes. In various implementations, the weights are selected to minimize a loss function. In various implementations, the training data includes an image and a scene graph of the image indicating, for each of a plurality of objects represented by the image, an object type of the object and a relationship vector indicating spatial relationships between the object and others of the plurality of objects. Further, the loss function is a function of the output of the scene graph neural network matching the scene graph. Thus, the weights of the scene graph neural network are selected such that the output of the scene graph neural network in response to an image is most likely to match the corresponding scene graph.

In various implementations, the scene graph neural network implements differentiable functions such that the training data can be backpropagated through the scene graph neural network to set the weights.

Thus, whereas the scene graph generator 110 of FIG. 1 includes, in various implementations, two separate neural networks, the end-to-end scene graph generator 610 of FIG. 6 includes a single neural network that is trained on training data to set the weights of its nodes.

As noted above, in various implementations, the end-to-end scene graph generator 610 includes a deep learning neural network including a plurality of layers. Similarly, in various implementations, the end-to-end scene graph generator 610 includes multiple stages, each including one or more layers.

The end-to-end scene graph generator 610 includes an object detection stage 611. The object detection stage 611 receives, as an input, the image 601 and produces, for each of the plurality of objects, a probability vector 621A of the object indicating the likelihood that the object is each of a plurality of object types and a location vector 622 indicating the location of the object in the image 601.

In various implementations, the location vector 622 for an object includes the coordinates in the two-dimensional coordinate system of the image 601 of each of four corners of a bounding box surrounding the object. In various implementations, the location vector 622 for an object includes the height and width of a bounding box surrounding the object and the coordinates in the two-dimensional coordinate system of the image 601 of a center of the bounding box.

As an example, in response to receiving the example image 201 of FIG. 2, the object detection stage 611 detects the cat 210 in a first region of the image and determines that the cat 210 has a probability of 0.40 of having an object type of "CAT", a probability of 0.45 of having an object type of "DOG", a probability of 0.03 of having an object type of "POST" and a probability of 0.02 of having an object type of "BONE". Further, the object detection stage 611 detects the scratching post 220 in a second region of the image and determines that the scratching post 220 has a probability of 0.10 of having an object type of "CAT", a probability of 0.1 of having an object type of "DOG", a probability of 0.75 of having an object type of "POST" and a probability of 0.05 of having an object type of "BONE". Further, the object detection stage 611 detects the rawhide bone 230 in a third region of the image and determines that the rawhide bone 230 has a probability of 0.10 of having an object type of "CAT", a probability of 0.10 of having an object type of "DOG", a probability of 0.05 of having an object type of "POST" and a probability of 0.75 of having an object type of "BONE".

In various implementations, the end-to-end scene graph generator 110 further includes a relationship estimation stage 612. The relationship estimation stage 612 receives, as an input, the probability vector 621A and the location vector 622 for each of the plurality of objects and produces, as an output, a relationship vector 623A for each of the plurality of objects. The relationship vector 623A for an object indicates a spatial relationship between the object and others of the plurality of objects. Spatial relationships include, but are not limited to, "IS NEAR", "IS FAR", "IS ABOVE", "IS BELOW", "IS IN FRONT OF", "IS BEHIND", "IS TO THE LEFT OF", and "IS TO THE RIGHT OF", and "HAS NO RELATION".

As an example, in response to receiving the probability vectors 621A and location vectors 622 generated by the object detection stage 611 for the example image 201 of FIG. 2, the relationship estimation stage 612 generates a relationship vector for the cat 210 indicating that the cat 210 "IS NEAR" the scratching post 220 and "IS ABOVE" the rawhide bone 230. Further, the estimation stage 612 generates a relationship vector for the scratching post 220 indicating that the scratching post 220 "IS NEAR" the cat 210 and "HAS NO RELATION" to the rawhide bone 230. Further, the estimation stage 612 generates a relationship vector for the rawhide bone 230 indicating that the rawhide bone 230 "IS BELOW" the cat 210 and "HAS NO RELATION" to the scratching post 220.

In various implementations, the relationship estimation stage 612 further produces, as an output, an updated probability vector 621B for each of the plurality of objects indicating the likelihood that the object is each of a plurality of object types.

The end-to-end scene graph generator 610 further includes a mixing stage 636. The mixing stage 636 receives, as an input, the updated probability vector 621B for each of the plurality of objects and the relationship vector 623A for each of the plurality of objects. In various implementations, the mixing stage 636 receives the probability vectors 621A and the relationship vectors 623A. In various implementations, the relationship vectors 623A initially provided to the mixing stage 636 are default relationship vectors. In various implementations, the relationship vectors 623A initially provided to the mixing stage 636 are generated by a relationship estimation stage 612 that generates the relationship vectors 623A based on the probability vectors 621A and the location vectors 622. The mixing stage 636 produces, as an output, an updated probability vector 621C for each the plurality of objects and an updated relationship vector 623B for each of the plurality of objects.

As an example, in response to receiving the updated probability vectors and the relationship vectors generated by the relationship estimation stage 612 for the example image 201 of FIG. 2, the mixing stage 636 updates the relationship vector for the cat 210 indicating that the cat 210 "IS NEAR" the scratching post 220 and "IS ABOVE" the rawhide bone 230. Further, the mixing stage 636 updates the relationship vector for the scratching post 220 indicating that the scratching post 220 "IS NEAR" the cat 210 and "HAS NO RELATION" to the rawhide bone 230. Further, the mixing stage 636 updates the relationship vector for the rawhide bone 230 indicating that the rawhide bone 230 "IS BELOW" the cat 210 and "HAS NO RELATION" to the scratching post 220.

Further, the mixing stage 636 updates the probability vector for the cat 210 to indicate that the cat 210 has a probability of 0.55 of having an object type of "CAT", a probability of 0.30 of having an object type of "DOG", a probability of 0.03 of having an object type of "POST" and a probability of 0.02 of having an object type of "BONE". Thus, the probability that the cat 210 is a cat has increased from 0.40 to 0.55 and the probability that the cat 210 is a dog has decreased from 0.45 to 0.30, in various implementations, in response to the cat 210 being near the scratching post 220 and it is more likely that a cat would be near a scratching post than a dog.

Further, the mixing stage 636 updates the probability vector for the scratching post 220 to indicate that the scratching post 220 has a probability of 0.1 of having an object type of "CAT", a probability of 0.05 of having an object type of "DOG", a probability of 0.8 of having an object type of "POST" and a probability of 0.05 of having an object type of "BONE". Thus, the probability that the scratching post 220 is a dog has decreased from 0.10 to 0.05 and the probability that the scratching post 220 is a post has increased from 0.75 to 0.80, in various implementations, in response to the scratching post 220 being near the cat 210 and it is more likely that a scratching post would be near a cat than a dog.

Further, the mixing stage 636 updates the probability vector for the rawhide bone 230 to indicate that the rawhide bone 230 has a probability of 0.05 of having an object type of "CAT", a probability of 0.15 of having an object type of "DOG", a probability of 0.05 of having an object type of "POST" and a probability of 0.75 of having an object type of "BONE".

The scene graph generator 110 includes a hard decision stage 613 which determines, for each object, an object type 624 of the object based on the updated probability vector 621C for the object. In various implementations, the hard decision stage 613 selects the object type with the highest probability of being correct. In various implementations, the hard decision stage 613 is integrated into mixing stage 636.

The scene graph generator 610 combines the object types 624 and the updated relationship vectors 623B, e.g., using a combiner 614, to generate and output the scene graph 630. In various implementations, the combiner 614 aggregates the object types 624 and the updated relationship vectors 623B to generate the scene graph 430.

Figure 7:
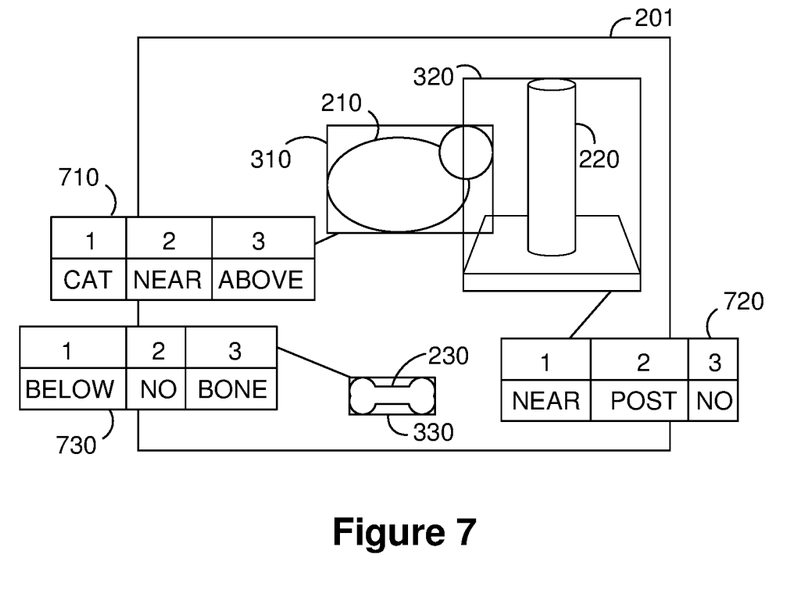
FIG. 7 illustrates the example image of FIG. 2 with bounding boxes labeled with correct object types and relationships.

FIG. 7 illustrates the example image 201 of FIG. 2 with bounding boxes based on the example location vectors produced by the object detection stage 611 in response to receiving the example image 201 and labels based on the example updated relationship vectors produced by the mixing stage 636 and the example object type 124 produced by the hard decision stage 613 in response to receiving the example image 201. FIG. 7 includes, surrounding a region of the image 201 representing the cat 210, a first bounding box 310 labeled with a first type-relationship vector 710. FIG. 7 includes, surrounding a region of the image 201 representing the scratching post 220, a second bounding box 320 labeled with a second type-relationship vector 710. FIG. 7 includes, surrounding a region of the image 201 representing the rawhide bone 230, a third bounding box 330 labeled with a third type-relationship vector 730. Each type-relationship vector for an object includes, in a position of the object, the object type, and in the positions of other objects, a spatial relationship of the object with the other object.

As noted above, in various implementations, the end-to-end scene graph generator 610 is a scene graph neural network. In various implementations, the neural network includes an interconnected group of nodes. In various implementations, each node includes an artificial neuron that implements a mathematical function in which each input value is weighted according to a set of weights and the sum of the weighted inputs is passed through an activation function, typically a non-linear function such as a sigmoid, piecewise linear function, or step function, to produce an output value. In various implementations, the scene graph neural network is trained on training data to set the weights. In various implementations, the weights are selected to minimize a loss function.

In various implementations, a semantic triplet includes the object type of a first object type, the object type of a second object, and the spatial relationship of the first object with respect to the second object. For example, a first semantic triplet indicates that a "POST"; "IS NEAR"; a "CAT". As another example, a second semantic triplet indicates that a "CAT"; "IS ABOVE"; a "BONE". In various implementations, the loss function is a function of each semantic triplet being correct. For example, a "POST"; "IS NEAR"; a "DOG" is treated as incorrect, although only the last element is incorrect.

In various implementations, the loss function is a function of each semantic triplet being correct and each object type being correct. Thus, as an example, a "POST"; "IS NEAR"; a "DOG" is treated as partially correct. In various implementations, the loss function is a function of each object type being correct and each spatial relationship being correct.

In various implementations, at least one of the nodes of the end-to-end scene graph generator (e.g., at least one node of the mixing stage 636) produces an output value based on at least one of the updated probability vectors 621B and at least one of the relationship vectors 623A. In various implementations, a plurality of the nodes of the end-to-end scene graph generator (e.g., a plurality of nodes of the mixing stage 636) produce output values based on at least one of the updated probability vectors 621B and at least one of the relationship vectors 623A. Thus, the relationship vectors 623A influence the values of the updated probability vectors 621C.

In various implementations, the object detection stage 611 further generates, for each object, an image feature vector 626 based on the pixel values within a region indicated by the location vector 622 for the object. In various implementations, the mixing stage 636 also takes, as inputs, the image feature vectors to generate the updated probability vectors 621C and updated relationship vectors 623B. Accordingly, in various implementations, the updated probability vectors 621C and/or the updated relationship vectors 623B are based on the image feature vectors 626.

Figure 8:
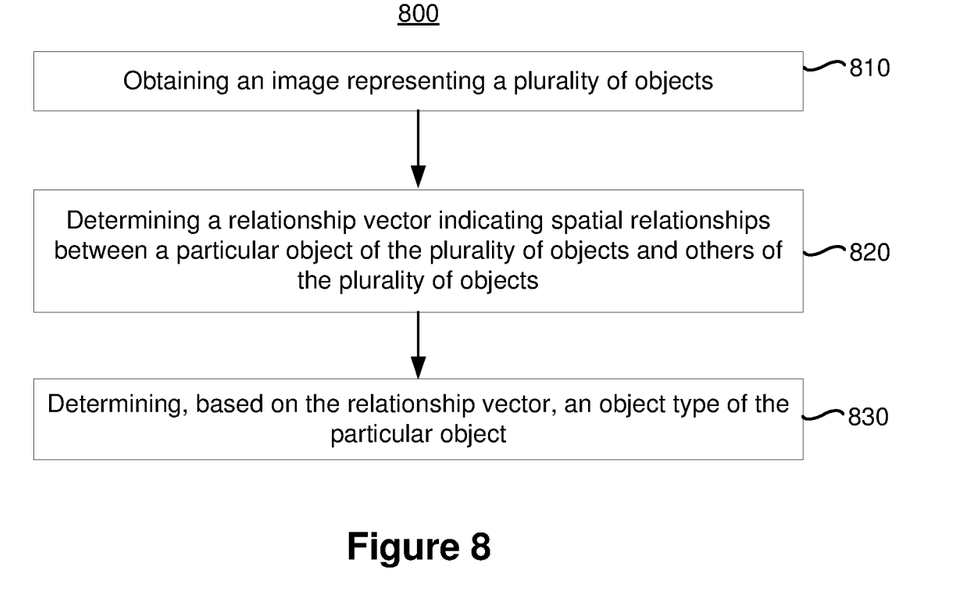
FIG. 8 is a flowchart representation of generating a scene graph in accordance with some implementations.

FIG. 8 is a flowchart representation of a method 800 of generating a scene graph in accordance with some implementations. In various implementations, the method 800 is performed by a device with one or more processors, and non-transitory memory. In some implementations, the method 800 is performed by processing logic, including hardware, firmware, software, or a combination thereof. In some implementations, the method 800 is performed by a processor executing instructions (e.g., code) stored in a non-transitory computer-readable medium (e.g., a memory). In various implementations, the method 800 is performed by a device executing the scene graph generator 610 of FIG. 6.

The method 800 begins, in block 810, with the device obtaining an image representing a plurality of objects. In various implementations, the image includes a plurality of pixels respectively located at a plurality of pixel locations in a two-dimensional coordinate system of the image. Each of the plurality of pixels has a respective pixel value.

The method 800 continues, in block 820, with the device determining a relationship vector indicating spatial relationships between a particular object of the plurality of objects and others of the plurality of objects. For example, in FIG. 1, the relationship estimator 112 takes, as an input, the probability vectors 121A and the location vectors 122 and produces, as an output, the relationship vectors 123. As another example, in FIG. 6, the relationship estimation stage 612 takes, as an input, the probability vectors 621A and the location vectors 622 and produces, as an output, the relationship vectors 623A.

In various implementations, the method includes determining a location vector indicating a location in the image of the particular object, wherein determining the relationship vector is based on the location vector. In various implementations, the method includes determining a probability vector indicating a probability that the particular object is each of a plurality of object types, wherein determining the relationship vector is based on the probability vector. For example, in FIG. 6, the object detection stage 611 takes, as an input, the image 401 and produces, as an output, the location vectors 622 and the probability vectors 621A.

In various implementations, the location vector includes four locations in a two-dimensional coordinate system of the image corresponding to corners of a bounding box surrounding the object. In various implementations, the location vector includes a height and width of a bounding box surrounding the object and a location in a two-dimensional coordinate system of the image corresponding to a center of the bounding box.

The method 800 continues, in block 830, with the device determining, based on the relationship vector, an object type of the particular object. For example, in FIG. 6, the mixing stage 636 takes, as an input, the relationship vectors 636 (and others) and produces, as an output, updated probability vectors 621C which are, in turn, used by the hard decision stage 613 to generate the object types 624. Accordingly, in various implementations, the method includes determining a probability vector indicating a probability that the particular object is each of a plurality of object types, wherein determining the object type is further based on the probability vector. In particular, in various implementations, determining the object type of the object comprises determining, based on the probability vector and the relationship vector, an updated probability vector indicating updated probabilities that the object is each of the plurality of object types and determining, based on the updated probability vector, the object type of the object.

In various implementations, determining the object type of the object includes applying a scene graph neural network to the image. Further, in various implementations, the method includes training the scene graph neural network. In various implementations, training the scene graph neural network includes providing training data in the form of a plurality of training images and respective scene graphs of the training images indicating, for each of a plurality of objects represented by the training image, an object type of the object and a relationship vector indicating spatial relationships between the object and others of the plurality of objects and setting weights of the scene graph neural network to minimize a loss function.

In various implementations, the loss function includes a first term indicating a semantic triplet match. In various implementations, the loss function further includes a second term indicating an object type match.

In various implementations, the scene graph neural network is a single neural network. In particular, in various implementations, the scene graph neural network implements differentiable functions such that training data can be backpropagated through the scene graph neural network. In various implementations, the scene graph neural network includes at least one mixing stage which generates updated probability vectors based on probability vectors and relationship vectors. In various implementations, the at least one mixing stage further generates updated relationship vectors.

Although FIG. 8 is described primarily with respect to a particular object, it is to be appreciated that the method 800 can be performed for multiple objects in a single image up to and including all the objects in a single image.

Figure 9:
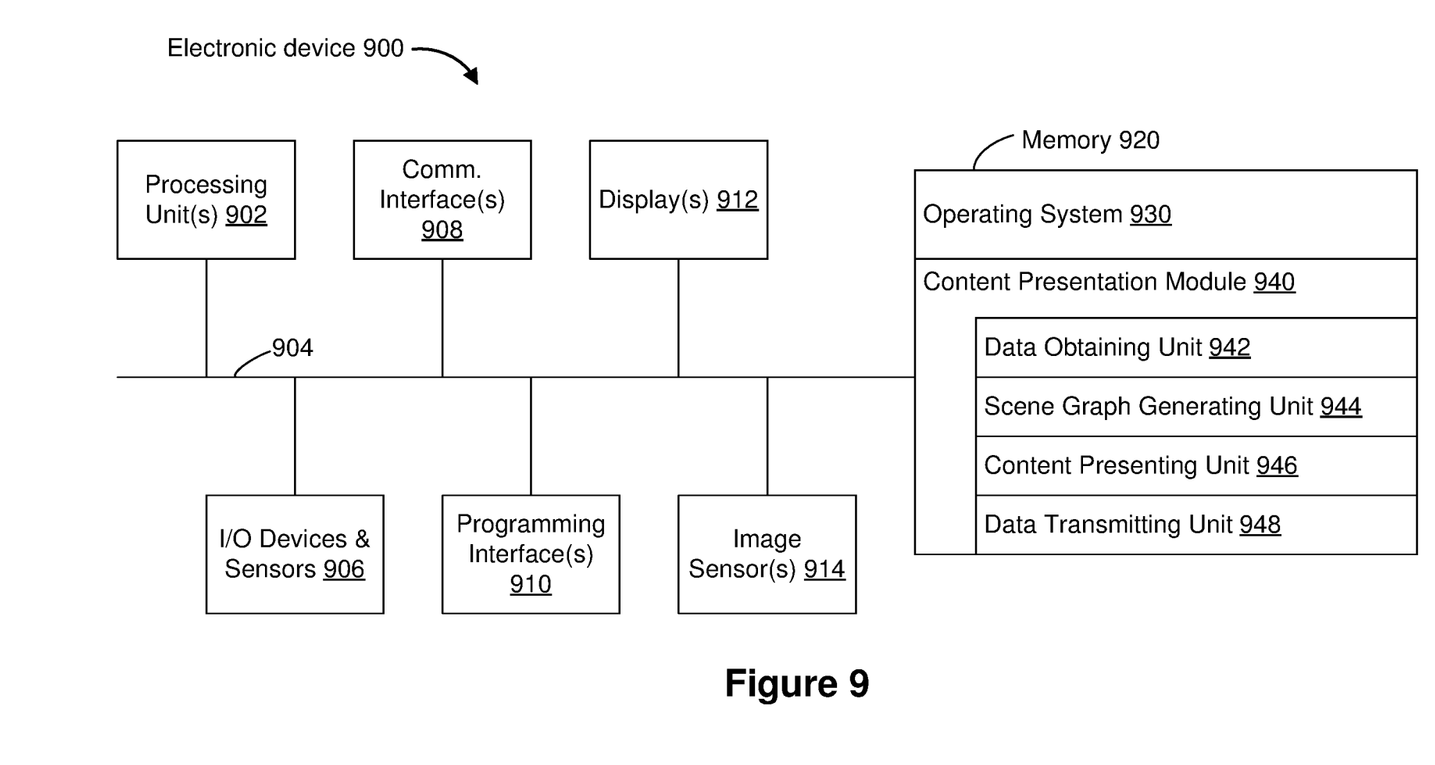
FIG. 9 is a block diagram of an electronic device in accordance with some implementations.

FIG. 9 is a block diagram of an electronic device 900 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 900 includes one or more processing units 902 (e.g., microprocessors, ASICs, FPGAs, GPUs, CPUs, processing cores, and/or the like), one or more input/output (I/O) devices and sensors 906, one or more communication interfaces 908 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 910, one or more displays 912, one or more optional interior- and/or exterior-facing image sensors 914, a memory 920, and one or more communication buses 904 for interconnecting these and various other components.

In some implementations, the one or more communication buses 904 include circuitry that interconnects and controls communications between system components. In some implementations, the one or more I/O devices and sensors 906 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more displays 912 are configured to present content to a user. In some implementations, the one or more displays 912 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 912 correspond to diffractive, reflective, polarized, holographic, etc. waveguide displays. In various implementations, the electronic device 900 includes a single display. In various implementations, the electronic device 900 includes a display for each eye of the user. In some implementations, the one or more displays 912 are capable of presenting AR, MR, and/or VR content.

In various implementations, the one or more displays 912 are video passthrough displays which display at least a portion of a real scene as an image captured by a scene camera. In various implementations, the one or more displays 912 are optical see-through displays which are at least partially transparent and pass light emitted by or reflected off the real scene.

In some implementations, the one or more image sensors 914 are configured to obtain image data that corresponds to at least a portion of the face of the user that includes the eyes of the user (any may be referred to as an eye-tracking camera). In some implementations, the one or more image sensors 914 are configured to be forward-facing so as to obtain image data that corresponds to the scene as would be viewed by the user if the electronic device 900 was not present (and may be referred to as a scene camera). The one or more optional image sensors 914 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 920 includes high-speed random-access memory, such as DRAM, SRAM, DDR RAM, or other random-access solid-state memory devices. In some implementations, the memory 920 includes non-volatile memory, such as one or more magnetic disk storage devices, optical disk storage devices, flash memory devices, or other non-volatile solid-state storage devices. The memory 920 optionally includes one or more storage devices remotely located from the one or more processing units 902. The memory 920 comprises a non-transitory computer readable storage medium. In some implementations, the memory 920 or the non-transitory computer readable storage medium of the memory 920 stores the following programs, modules and data structures, or a subset thereof including an optional operating system 930 and a content presentation module 940.

The operating system 930 includes procedures for handling various basic system services and for performing hardware dependent tasks. In some implementations, the content presentation module 940 is configured to present content to the user via the one or more displays 912. To that end, in various implementations, the presentation module 940 includes a data obtaining unit 942, a scene graph generating unit 944, a content presenting unit 946, and a data transmitting unit 948.

In some implementations, the data obtaining unit 942 is configured to obtain data (e.g., presentation data, interaction data, sensor data, location data, etc.). The data may be obtained from the one or more processing units 902 or another electronic device. To that end, in various implementations, the data obtaining unit 942 includes instructions and/or logic therefor, and heuristics and metadata therefor.

In some implementations, the scene graph generating unit 944 is configured to generate a scene graph based on an image representing a plurality of objects. In various implementations, the image is obtained by the data obtaining unit 942, e.g., from the image sensor 914. To that end, in various implementations, the scene graph generating unit 944 includes instructions and/or logic therefor, and heuristics and metadata therefor.

In some implementations, the content presenting unit 946 is configured to present content via the one or more displays 912. In various implementations, the content is based on the scene graph generated by the scene graph generating unit 944. To that end, in various implementations, the content presenting unit 846 includes instructions and/or logic therefor, and heuristics and metadata therefor.

In some implementations, the data transmitting unit 948 is configured to transmit data (e.g., presentation data, location data, etc.) to the one or more processing units 902, the memory 920, or another electronic device. To that end, in various implementations, the data transmitting unit 948 includes instructions and/or logic therefor, and heuristics and metadata therefor.

Although the data obtaining unit 942, the scene graph generating unit 944, the content presenting unit 946, and the data transmitting unit 948 are shown as residing on a single electronic device 900, it should be understood that in other implementations, any combination of the data obtaining unit 942, the scene graph generating unit 944, the content presenting unit 946, and the data transmitting unit 948 may be located in separate computing devices.

Moreover, FIG. 9 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 9 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
obtaining an image representing a plurality of objects;
determining, based on the image, a relationship vector indicating spatial relationships between a particular object of the plurality of objects and others of the plurality of objects; and
determining, based on the spatial relationships between the particular object of the plurality of objects and the others of the plurality of objects, an object type of the particular object.

2. The method of claim 1, further comprising determining a location vector indicating a location in the image of the particular object, wherein determining the relationship vector is based on the location vector.

3. The method of claim 2, wherein the location vector includes four locations in a two-dimensional coordinate system of the image corresponding to corners of a bounding box surrounding the object.

4. The method of claim 2, wherein the location vector includes a height and width of a bounding box surrounding the object and a location in a two-dimensional coordinate system of the image corresponding to a center of the bounding box.

5. The method of claim 1, further comprising determining a probability vector indicating a probability that the particular object is each of a plurality of object types, wherein determining the relationship vector is based on the probability vector.

6. The method of claim 1, further comprising determining a probability vector indicating a probability that the particular object is each of a plurality of object types, wherein determining the object type is further based on the probability vector.

7. The method of claim 1, wherein determining the object type of the object includes applying a scene graph neural network to the image.

8. The method of claim 7, further comprising training the scene graph neural network comprising:
providing training data in the form of a plurality of training images and respective scene graphs of the training images indicating, for each of a plurality of objects represented by the training image, an object type of the object and a relationship vector indicating spatial relationships between the object and others of the plurality of objects;
setting weights of the scene graph neural network to minimize a loss function.

9. The method of claim 8, wherein the loss function includes a first term indicating a semantic triplet match.

10. The method of claim 9, wherein the loss function further includes a second term indicating an object type match.

11. The method of claim 7, wherein the scene graph neural network is a single neural network.

12. The method of claim 7, wherein the scene graph neural network implements differentiable functions such that training data can be backpropagated through the scene graph neural network.

13. The method of claim 7, wherein the scene graph neural network includes at least one mixing stage which generates updated probability vectors based on probability vectors and relationship vectors.

14. The method of claim 13, wherein the at least one mixing stage further generates updated relationship vectors.

15. An electronic device comprising:
non-transitory memory; and
a processor to:
obtain an image representing a plurality of objects;
determine, based on the image, a relationship vector indicating spatial relationships between a particular object of the plurality of objects and others of the plurality of objects; and
determine, based on the spatial relationships between the particular object of the plurality of objects and the others of the plurality of objects, an object type of the particular object.

16. The electronic device of claim 15, wherein the one or more processors are to determine the object type of the object includes applying a scene graph neural network to the image.

17. The electronic device of claim 16, wherein the scene graph neural network implements differentiable functions such that training data can be backpropagated through the scene graph neural network.

18. The electronic device of claim 16, wherein the scene graph neural network includes at least one mixing stage which generates updated probability vectors based on probability vectors and relationship vectors.

19. The electronic device of claim 18, wherein the at least one mixing stage further generates updated relationship vectors.

20. A non-transitory computer-readable medium having instructions encoded thereon which, when executed by one or more processors of an electronic device, cause the electronic device to:
obtain an image representing a plurality of objects;
determine, based on the image, a relationship vector indicating spatial relationships between a particular object of the plurality of objects and others of the plurality of objects; and
determine, based on the spatial relationships between the particular object of the plurality of objects and the others of the plurality of objects, an object type of the particular object.

* * * * *